Oct. 28, 1958 L. C. MERRILL 2,858,438
VOLTAGE COMPARATORS
Filed July 2, 1956

INVENTOR.
LESLIE C. MERRILL
BY
George A. Yust
ATTORNEY

United States Patent Office 2,858,438
Patented Oct. 28, 1958

2,858,438

VOLTAGE COMPARATORS

Leslie C. Merrill, Fort Wayne, Ind., assignor to International Telephone and Telegraph Corporation Application July 2, 1956, Serial No. 595,476

6 Claims. (Cl. 250—36)

This invention relates to voltage comparators and is particularly directed to circuits for accurately indicating when two unrelated voltages arrive at a common value.

The "Multiar" circuit is shown on page 357 of the 1952 book by O. S. Puckle entitled "Time Basis," Chapman & Hall, Ltd., 35 Essex Street, W. C. 2, or on pages 343–344, vol. 19, of the M. I. T. Radiation Laboratory Series entitled "Waveforms." A multiar circuit comprises an amplifier tube such as a pentode with a transformer coupled between the cathode and grid circuits and so arranged that the resultant positive feedback is rendered inoperative by a diode in series with the secondary winding of the transformer. The diode is normally biased by a known voltage so that it will not conduct and, hence, normally prevents feedback. When the amplitude of the unknown voltage increases sufficiently to overcome the known bias, the diode becomes conductive, the feedback circuit is completed, and oscillations commence. If the grid circuit also contains a series coupling condenser, the amplifier functions as a blocking oscillator. Such a "Multiar" circuit is useful in producing a sharp pulse when the known and unknown voltages reach a common value.

Unfortunately, the conducting or "firing point" of the diode is unpredictable. Where the diode is of the semiconductor type, for example, the voltage-current characteristic varies widely among apparently identical diodes, and in most commercially obtainable diodes the voltage-current characteristic is an important function of temperature and age.

The object of this invention is to provide an improved "Multiar"-type circuit for comparing two voltages and reliably obtaining a distinct signal when those two voltages are equal.

The objects of this invention are attained by an oscillator having a high-gain amplifier characterized in that two parallel circuits are coupled between output and input electrodes of said amplifier, said circuits including means, respectively, for feeding back degenerative and regenerative energy, and means in each circuit responsive, respectively, to the voltages to be compared for changing the relative effective resistances of said two circuits.

Figure 1:
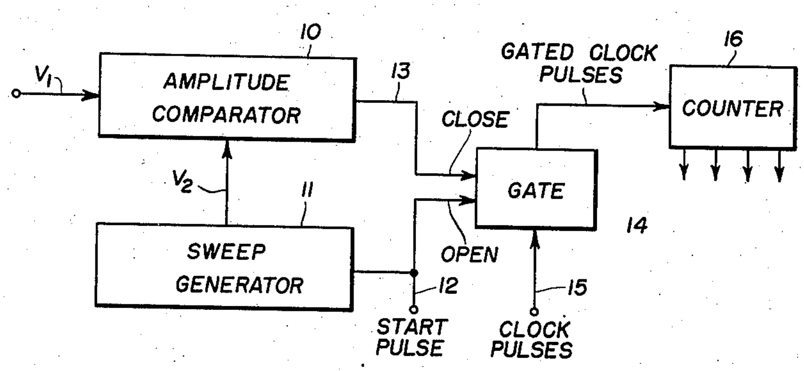
Figure 2:
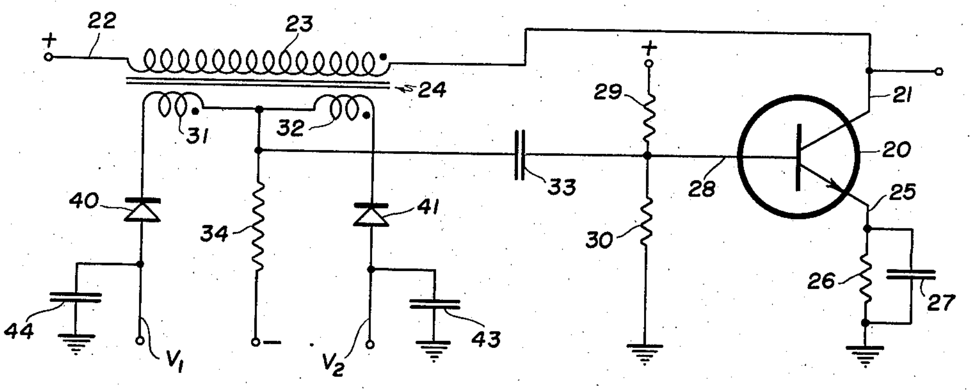

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a block diagram of one circuit adapted to the voltage comparator of this invention; and Fig. 2 is a circuit diagram of one voltage comparator embodying this invention.

One embodiment of this invention is shown in Fig. 2 where the transistor 20 is coupled as an oscillator. A triode, pentode, or any high gain amplifier could be used in place of the transistor. In the example shown, a feedback circuit is coupled between the collector 21 and the base 28 through the transformer 24. The secondary of the transformer is a center-tapped winding 31—32 with the two voltages $V_1$ and $V_2$ applied to opposite ends of the secondary, respectively, through diodes 40 and 41. With the feedback circuit complete to the center tap, degenerative or regenerative energy is fed back depending upon the relative conductance of winding 31 and 32 and the diodes 40 and 41. When the voltages $V_1$ and $V_2$ cross in amplitude, the feedback suddenly changes from degenerative to regenerative polarity. Since the two diodes are side-by-side and subject to the same environmental changes, the voltage comparator of this invention is relatively free from such changes and is stable and reliable in operation.

In Fig. 1 the voltage comparator 10 is designed to produce an output pulse when two input pulses $V_1$ and $V_2$ are equal. For example, $V_1$ may be an unknown voltage to be measured while $V_2$ may comprise a saw-tooth voltage supplied by sweep generator 11. In the circuit of Fig. 1, the sweep generator is started by a pulse at terminal 12 and when the sweep voltage is equal to the unknown voltage, $V_1$, the output 13 is applied to gate 14. The gate may be opened by the starting pulse and closed by the comparator output pulse so that clock pulses at 15 will be counted at 16 in accordance with the time the gate remains open. Thus a convenient analog-to-digital converter is provided.

The accuracy of the comparator depends upon the reliability of the comparator to produce the closing pulse at the instant the two voltages $V_1$ and $V_2$ are equal. The comparator must be relatively insensitive to environmental and age changes.

In Fig. 2 is shown a comparator with the transistor 20 coupled as an oscillator but subject to characteristic changes especially in the emitter to base voltage and in temperature variations. The transistor shown is of the NPN type with the collector 21 connected to the positive voltage source 22 through the primary winding 23 of transformer 24. The emitter 25 is self-biased by the resistor 26 shunted by the high frequency by-pass condenser 27. The base 28 is statically biased by a tap suitably placed in potentiometer 29 and 30 connected across a voltage source. This voltage source may be that of terminal 22.

The novel feedback circuit of the transistor 20 comprises the primary winding 23 and the two secondary windings 31 and 32, center-tapped as shown and coupled to the transistor base through coupling condenser 33. Since the secondary transformer winding is center-tapped, the feedback to the base is positive or negative, depending upon which secondary winding 31 or 32 is relatively more conductive. If the feedback circuit is positive the transistor will function as an oscillator if, of course, the feedback energy is sufficient with respect to the losses of the circuits. According to an important feature of this invention the condenser in series with the base circuit causes the transistor to function as a blocking oscillator, the time constant of the oscillator being essentially determined by the capacity of condenser 33 and the resistance of resistor 34.

The polarity of the feedback energy for the oscillator is according to this invention determined by the diodes 40 and 41 connected respectively between the input terminals to which the voltages $V_1$ and $V_2$ are applied. By-pass condensers to ground are shown at 43 and 44 and are of such capacity as to provide low impedance to the oscillation frequencies.

The fact that the diode bridge circuit is A. C. coupled to the blocking oscillator means the accuracy of comparison of voltages $V_1$ and $V_2$ is a function of the gain of the active device and quite insensitive to variations of operating point. This is quite important when considering transistors since the element voltage drops at given current flows can vary by many millivolts over a 60° temperature range. Operating voltages of transistors may vary from unit to unit. Of course, the same variations are present in semi-conductor diodes, but since at the firing point the diode currents are nearly equal, the temperature variations of diode voltage drops cancel to a considerable degree. In Fig. 2 the amount of total diode current is controlled by the feed resistor 34. This fixes the dynamic resistance of the diodes at the firing point since the dynamic resistance is primarily a function of current flow. Where the diodes are of the silicon junction type such as that commercially obtainable as the "Hughes Type HD6005," the temperature stability is relatively good. For example, as the temperature increases from 25° to 75° C., the voltage difference at firing point increases from 5.3 millivolts to 10.0 millivolts.

The diodes 40 and 41 should be selected by accurately matching the room temperature forward voltage drop at one-half the current applied by resistor 34 which in one embodiment was 5 microamperes.

With reasonably well matched diodes at 40 and 41 the current may be adjusted by varying resistor 34 or by varying the bias voltage applied to said resistor, to cause the diodes to be most sensitive to voltage changes. That is, the current flow through the resistor 34 sets the impedance level of the feedback circuit at the critical point by controlling the dynamic resistance of the diodes. There is an optimum level and hence an optimum current which maximizes the circuit sensitivity. Hence a few millivolts difference in the two inputs $V_1$ and $V_2$ can radically change the current distribution in the two windings 31 and 32 with corresponding changes in resistances in the two secondary winding circuits. It follows that as the voltage at $V_2$ crosses the voltage at $V_1$, the polarity of the feedback circuit can be suddenly changed from negative to positive feedback. At the instant of crossover, the transistor starts to oscillate but is blocked after one excursion by the series coupling condenser 33 in the feedback circuit.

If the nominal gain of transistor 20, or other active amplifier device, is sufficiently high, substantial gain variations can be tolerated in the amplifier with but little loss in accuracy in the comparator since a small change in the difference firing voltage is sufficient to swing the loop gain by many orders of magnitude. For example, it was found that by substituting transistors 20 from a random batch of transistors having widely different common emitter gain figures moved the firing point by less than ±5 millivolts. It is to be remembered that any positive feedback system becomes unstable when the gain around the loop becomes any small value greater than unity. For the bridge comparator at exactly the balance point, the gain around the loop is, of course, zero, but if the amplifier gain is large, say 100, then the bridge circuit need only pass one percent (1%) of the signal in order to reach unity loop gain. For conditions near balance, the transmission of the bridge portion of the loop is primarily dependent upon the difference in dynamic diode resistance. In the "Multiar" circuit heretofore referred to, the transmission of the single diode circuit is primarily dependent on the ratio of total dynamic diode resistance to some fixed circuit resistance. In the comparator of this invention, however, the balancing resistance of the two diodes varies correspondingly with age or environmental changes.

Where the transistor is of the commercial "903" type and the diodes are of the Hughes type mentioned, the feed resistor 34 should be about 2 megohms and the winding ratio of transformer 34 should be about 5:1:1. That is, windings 31 and 32 should be equal in number and individually equal to ⅕ the turns of winding 23. In such a comparator the output pulse was found to be 1 microsecond in duration and when the coupling condenser 33 was 250 micromicrofarads the pulse repetition was every 200 microseconds.

While I have described the principles of my invention in connection with specific apparatus, it is to be clearly understood that this description is made only by way of example and not as a limitation to the scope of my invention.

What is claimed is:

1. A voltage comparator of the multiar-type including an oscillator having a high-gain amplifier with input and output electrodes, characterized in that two symmetrical series circuits connected in parallel are coupled between the output and input electrodes of said amplifier, said circuits including means, respectively, for feeding back both degenerative and regenerative energy, and means in each circuit, responsive respectively, to the voltages to be compared for changing the relative effective resistances of said two circuits.

2. A sensitive amplifier with two symmetrical input circuits and an output circuit and having a gain of very much more than unity, and having a feedback circuit between the input and output circuits; said feedback circuit comprising means for rapidly and selectively reversing the polarity of feedback energy in response to a difference in the respective voltages of said inputs.

3. In a voltage comparator having a sensitive relay with a control electrode and a positive output-to-input feedback circuit characterized in that the voltages to be compared are impressed respectively through similar diodes to opposite ends of a center tapped secondary winding of a feedback transformer, the center tap of said winding being coupled through a time-constant circuit to the control electrode of the relay so that environmental changes of parameters of the diodes similarly affect the diodes without changing their difference voltages.

4. In combination in a voltage comparator, an amplifier with an input circuit and an output circuit, a feedback path comprising a transformer with a primary winding in said output circuit and with two series-aiding secondary windings, a coupling condenser, the junction of said two secondary windings being connected through said condenser to the amplifier input circuit, two diodes and two input terminals for voltages to be compared connected, respectively, through said diodes to the other ends of said two windings.

5. In combination in a sensitive voltage comparator comprising a blocking oscillator, the feedback circuit of the oscillator having a transformer primary winding in the output of the oscillator inductively coupled to two secondary windings, said two windings being connected in series-aiding fashion and the junction thereof connected to the input of the oscillator, two input terminals, and means connected between the two terminals and said two windings for rapidly changing the relative resistances of the circuits of said two windings in response to changes in relative voltages applied to said terminals.

6. In combination in a voltage comparator, an oscillator, a circuit for feeding back oscillatory energy from the output to the input of the oscillator, said circuit including a transformer with a center-tapped winding, two input circuits respectively for the voltages to be compared and means coupled to said input circuits and responsive to voltages to be compared for rapidly and selectively changing the relative impedances of the windings on either side of the center-tap to change the oscillator feedback energy from negative to positive.

References Cited in the file of this patent

UNITED STATES PATENTS 2,726,329 Henderson ------------ Dec. 6, 1955

FOREIGN PATENTS 880,294 France ---------------- Dec. 8, 1942